(12) United States Patent
Colston

(10) Patent No.: US 11,583,138 B2
(45) Date of Patent: *Feb. 21, 2023

(54) GRILL WITH BATTERY POWER SYSTEM AND MEASUREMENT

(71) Applicant: Traeger Pellet Grills, LLC, Salt Lake City, UT (US)

(72) Inventor: Michael V. Colston, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/301,929

(22) Filed: Apr. 19, 2021

(65) Prior Publication Data

US 2021/0235927 A1  Aug. 5, 2021

Related U.S. Application Data

(63) Continuation of application No. 16/362,270, filed on Mar. 22, 2019, now Pat. No. 10,986,960.

(60) Provisional application No. 62/648,220, filed on Mar. 26, 2018.

(51) Int. Cl.
| | |
|---|---|
| *A47J 37/07* | (2006.01) |
| *F23Q 7/02* | (2006.01) |
| *F23Q 13/00* | (2006.01) |
| *F24B 15/00* | (2006.01) |
| *F24B 13/04* | (2006.01) |

(52) U.S. Cl.
CPC ....... *A47J 37/0709* (2013.01); *A47J 37/0763* (2013.01); *A47J 37/0786* (2013.01); *F23Q 7/02* (2013.01); *F23Q 13/00* (2013.01); *F24B 13/04* (2013.01); *F24B 15/005* (2013.01)

(58) Field of Classification Search
CPC . A47J 37/0709; A47J 37/0763; A47J 37/0786
USPC .............................................. 126/9 R, 25 R
See application file for complete search history.

(56) References Cited

U.S. PATENT DOCUMENTS

| | | | |
|---|---|---|---|
| 5,429,110 A | 7/1995 | Burke et al. | |
| 2004/0026946 A1 | 2/2004 | Reed et al. | |
| 2009/0174212 A1 | 7/2009 | Donoho et al. | |
| 2011/0297010 A1* | 12/2011 | Wilson ................ | A47J 37/0629 99/378 |
| 2015/0312964 A1 | 10/2015 | Sorenson et al. | |

(Continued)

OTHER PUBLICATIONS

Great Britain Search Report from Application No. 1904198, dated May 28, 2019, 7 pages.

(Continued)

*Primary Examiner* — Vivek K Shirsat
(74) *Attorney, Agent, or Firm* — TraskBritt

(57) ABSTRACT

A portable grill with a battery power system includes a primary direct-current power source and a secondary direct-current power source. The primary power source can connect onto the outside of the grill via a clip. The secondary power source, which can be disposed within the grill so as not to be exposed to outside elements, can continue to power the grill when the user removes and/or replaces the primary power source during the operation of the grill. A user feedback system can remotely alert the user with information regarding the time or power remaining in the primary power source.

19 Claims, 6 Drawing Sheets

(56) References Cited

U.S. PATENT DOCUMENTS

2016/0003484 A1* 1/2016 Spanò .................... F24C 3/126
126/39 E
2017/0059172 A1* 3/2017 Johnson ............... H05B 1/0263
2017/0095106 A1 4/2017 Cook
2018/0040795 A1* 2/2018 Lam .................... A47J 37/0786

OTHER PUBLICATIONS

Reddit "Can we hot swap batteries" (Sep. 26, 2019) [https://www.reddit.com/r/lgv20/comments/72lntt/can_we_hot_swap_batteries/].

* cited by examiner

GRILL WITH BATTERY POWER SYSTEM AND MEASUREMENT

CROSS-REFERENCE TO RELATED APPLICATIONS

This application is a continuation of U.S. patent application Ser. No. 16/362,270, filed Mar. 22, 2019, now U.S. Pat. No. 10,986,960, issued Apr. 27, 2021, which application claims priority to and the benefit of U.S. Provisional Application Ser. No. 62/648,220 entitled "Grill with Battery Power System and Measurement", filed on Mar. 26, 2018, the disclosure of each of which is hereby incorporated herein in its entirety by this reference.

TECHNICAL FIELD

The present invention relates generally to systems, methods, and devices for grilling and warming food products. In particular, the present invention relates to systems, methods, and devices for powering grilling devices.

BACKGROUND

Users often prepare food on grilling devices such as pellet grills. Pellet grills include a number of components that require electric power, such as heating elements, fuel feeder systems, blowers, and the like. Typical pellet grills usually receive power through a power cord plugged in to an alternating current (AC) household outlet or another stationary outlet.

However, power cords reduce the portability of pellet grills. For example, in order to power a pellet grill from an outlet, the pellet grill cannot be further away from the outlet than the length of the power cord. This limits the use of typical pellet grills to locations having stationary outlets, such as houses, buildings, or other structures. Users cannot prepare food in such pellet grills elsewhere, for example, at a park or campsite that lacks such outlets. Users may bring generators to such locations, but generators are loud, heavy, and expensive. In addition, corded pellet grills may limit users to using the grill in dry conditions only, due to concerns over exposing the power cord to moisture from rain and snow.

Other types of grills, such as gas-powered grills, cook at higher temperatures and require less time. However, as noted above, pellet grills and smokers generally require much longer cook times because they operate at lower temperatures. Monitoring the grill during these long cook times is inconvenient and time-consuming. Many users, for example, will stay nearby their pellet grills during long cook times so they can monitor and control temperatures, smoke color and amount, or other grilling conditions.

Accordingly, there are a number of disadvantages in grilling devices and systems that can be addressed.

BRIEF SUMMARY

Embodiments of the present disclosure solve one or more of the foregoing or other problems in the art with systems, methods, and devices for grills, such as pellet grills, that employ one or more direct-current power supplies, as well as components and sub-components thereof. For example, one embodiment of the present invention includes a pellet grill having a primary direct-current power source that is removable and a secondary direct-current power source. The secondary direct-current power source powers the grilling device when the primary direct-current power source is removed. In addition, the primary direct-current power source is removably secured to the grilling device via a clip. Such an embodiment also includes a user feedback system that relays information regarding the primary direct-current power source to the user.

In one embodiment, a portable grilling device includes a primary direct-current power source that is removable and a secondary direct-current power source. The secondary direct-current power source powers the portable grilling device when the primary direct-current power source is removed. The primary direct-current power source is configured to connect to the portable grilling device via a clip and the secondary direct-current power source is disposed inside the portable grilling device so as not to be exposed to outside elements.

In one embodiment of the present disclosure, a method of powering a portable grilling device includes at least five steps. The first step includes connecting a first primary direct-current power source to the portable grilling device via a clip. The second step includes relaying a notification regarding the first primary direct-current power source to a mobile device. The third step includes removing the first primary direct-current power source from the portable grilling device. The fourth step of the method includes powering the portable grilling device with a secondary direct-current power source while the first primary direct-current power source is removed. Finally, the fifth step of the method includes connecting a second primary direct-current power source to the portable grilling device via the clip.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention relates generally to systems, methods, and devices for grilling and warming food products. In particular, embodiments of the present invention relate to pellet grills powered by a direct-current power source. For example, one embodiment of the present invention includes a pellet grill having a primary direct-current power source that is removable and a secondary direct-current power source. The secondary direct-current power source powers the grilling device when the primary direct-current power source is removed. In addition, the primary direct-current power source is removably secured to the grilling device via a clip. Such an embodiment also includes a user feedback system that relays information regarding the primary direct-current power source to the user.

Embodiments of grills with battery power systems and measurement capabilities provide a number of advantages over the prior art. For example, grills of the present disclosure do not need to be tethered to a stationary outlet through a power cord. In addition, secondary power sources can periodically power the various components of the grill while the primary power source is replaced or recharged. The direct-current power sources can safely power the grill in wet conditions and increase the portability of the grill. A feedback system can also remotely alert the user regarding the status and remaining power of the primary and/or secondary direct-current power sources.

Figure 1:
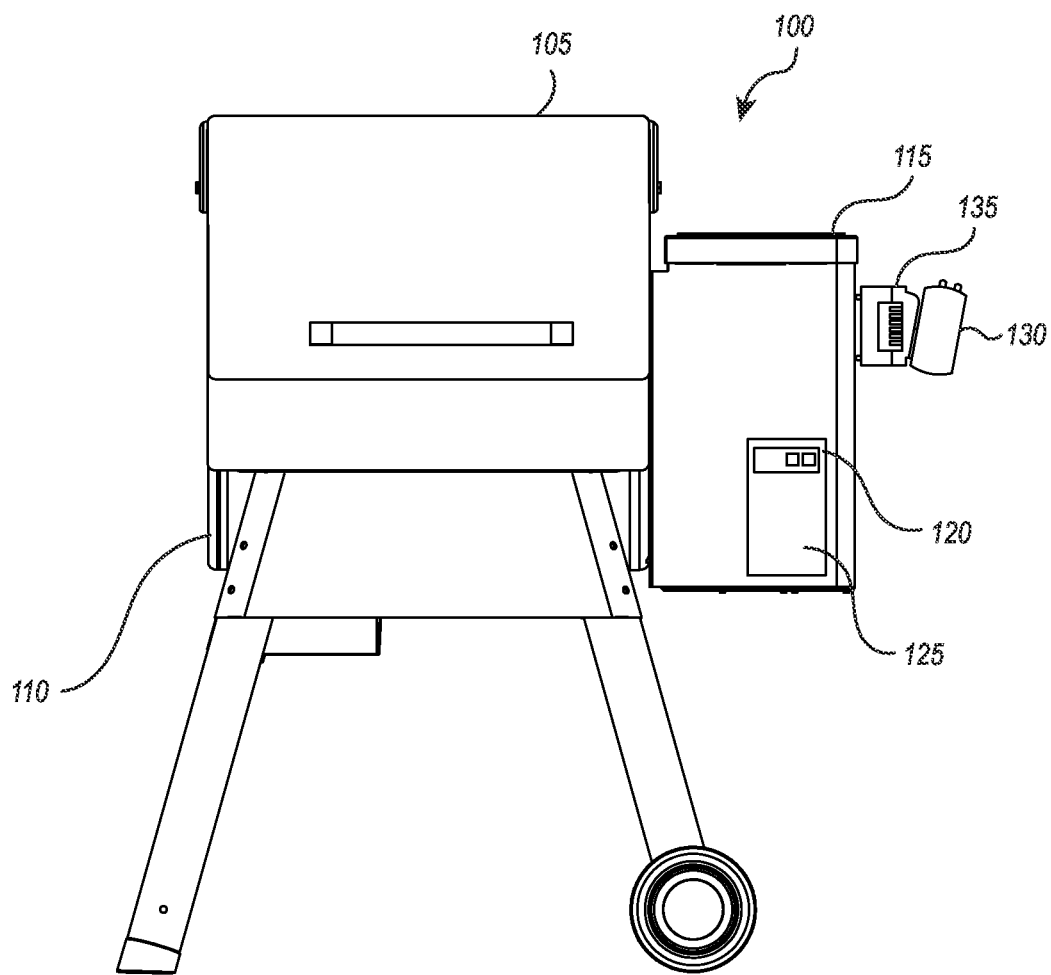
FIG. 1 illustrates an embodiment of a pellet grill with battery power systems and measurements according to an embodiment of the present disclosure.

Turning now to the figures, FIG. 1 illustrates a pellet grill 100 with a battery power system according to an embodiment of the present disclosure. The pellet grill 100 generally has an upper compartment 105 in which a user can prepare food and a lower portion 110 below the upper compartment 105 housing an auger feeder system and a firepot. The lower portion 110 of the pellet grill 100 can also include various other components, such as a blower, and a heating element. The pellet grill 100 also includes a hopper 115. A user can open the lid of the hopper 115 and introduce solid fuel, such as wood pellets, into the auger feeder system in the lower portion 110 of the pellet grill 100 through the hopper 115.

Figure 2A:
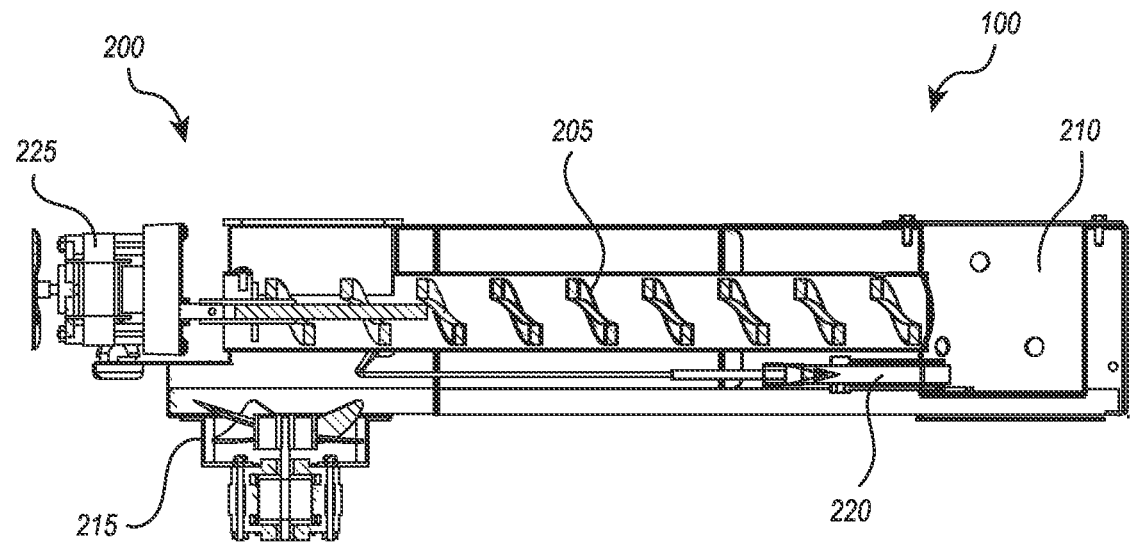
FIG. 2A illustrates an embodiment of various internal components of a pellet grill with battery power and systems and measurements according to the present disclosure.

Along these lines, FIG. 2A illustrates the various internal components of a pellet grill 100, including an auger feeder system 200 having an auger 205 and a motor 225, a firepot 210, a blower 215, and a heating element 220. In the illustrated embodiment, the motor 225 engages and rotates the auger 205. In at least one embodiment, the firepot 210 is disposed at the end of the auger 205 to receive fuel pellets through an opening in the side of the firepot 210. The heating element 220 is also disposed at or near the firepot 210 to ignite fuel pellets that may reside within the firepot 210.

In addition, in at least one embodiment, the pellet grill 100 may include a blower 215 disposed within the lower portion 110. The blower 215 circulates air throughout the lower portion 110 and over and/or around the heating element 220 and firepot 210. The circulating air may enter the firepot 210 through the top opening thereof or through one or more holes extending through the floor and/or sidewalls of the firepot 210. In this way, the blower 215 aids in the ignition and combustion of the fuel inside the firepot 210 by providing oxygen to the interior space of the firepot 210.

Figure 2B:
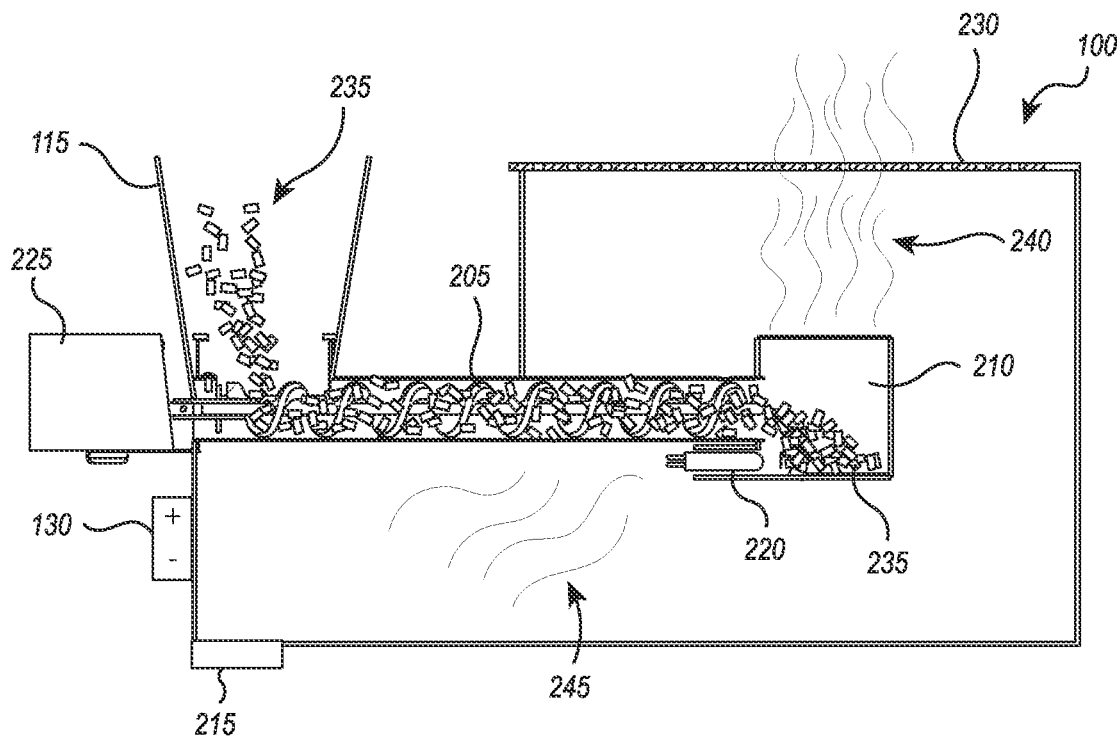
FIG. 2B illustrates the internal components illustrated in FIG. 2A during use according to an embodiment of the present disclosure.

Along these lines, FIG. 2B illustrates an embodiment of the internal components of the pellet grill 100 in use. The embodiment illustrated in FIG. 2B also includes a heating/grilling surface 230, fuel pellets 235, and a direct-current power source 130. In this particular embodiment, a user feeds the fuel pellets 235 into the auger 205 via the hopper 115. The motor 225 engages and rotates the auger 205 to feed the fuel pellets 235 into the firepot 210 for combustion, which produces heat and smoke 240.

In at least one embodiment, the blower 215 blows air over the heating element 220 and into the firepot 210 where the fuel pellets 235 reside. The direct-current power source 130 provides electrical current to the heating element 220, which heats up due to the electrical resistance of the heating element 220. The temperature of the heating element 220 transfers to the fuel pellets 235 inside the firepot 210 to ignite the fuel pellets 235.

In at least one embodiment, the heating element 220 ignites fuel pellets 235 in the firepot 210 through direct contact. Alternatively, or additionally, in at least one embodiment, the blower 215 can blow air 245 over the heating element 220 and into the firepot 210 to ignite fuel pellets 235 via convective heat transfer. For example, in at least one embodiment, the heating element 220 heats the circulating air 245 from the blower 215 as it passes over the heating element 220. This heated air 245 ignites the fuel pellets 235 residing inside the firepot 210. Once ignited, the fuel pellets 235 burn, producing heat and smoke 240 that rises to warm/heat the space surrounding the heating/grilling surface 230 of the pellet grill 100.

In addition, in at least one embodiment, the firepot 210 is perforated for increased ventilation. In such an embodiment, circulating air 245 from the blower more easily enters the firepot 210 through perforations to increase the rate of combustion and/or ignition of fuel pellets 235 inside the firepot 210.

The internal components of the grill illustrated in FIGS. 2A and 2B and described above, may be controlled to affect the temperature and amount of smoke 240 emanating from the firepot 210 during operation. For example, in at least one embodiment, the pellet grill 100 comprises a controller that regulates the amount of electrical current provided to the heating element 220. The controller capable of intermittently turning the heating element on and off. In doing so, the controller adjusts the amount of ignition and level of burning that occurs in the firepot 210.

Also, for example, the controller may adjust the amount of power given to the motor 225 to speed up or slow down the auger 205. Slowing down the auger 205 reduces the rate of fuel pellets 235 that enter the firepot 210, thus reducing available fuel and affecting the amount and temperature of fuel combustion and smoke production.

In addition, the controller may regulate power to the blower 215 to increase or reduce the amount of oxygen flowing into the firepot 210 for combustion and over the heating element 220 for ignition. Thus, in at least one embodiment, the blower 215 may be regulated to also affect the rate of combustion and ignition in the firepot 210, which results in changes in the temperature and amount of smoke emanating from the firepot 210.

One will also appreciate that such a controller may also regulate the heating element 220, blower 215, and motor 225 in combination to affect the temperature and amount of smoke emanating from the firepot 210. For example, in at least one embodiment, the controller may intermittently turn the heating element 220 on and off for repeated ignition, regulate the blower 215, and regulate the motor 225 so that fuel pellets 235 within the firepot 210 avoid high-temperature, self-sustained combustion.

Accordingly, in at least one embodiment, the precise regulation of these components may allow a user to specify any number of different cooking conditions within the grill. For example, a user may specify a cooking condition that results in the fuel pellets 235 smoldering within the firepot 210, rather than combusting. As used herein "smoldering" includes the burning of fuel pellets 235 at a temperature that does not result in a self-sustained, runaway combustion that ignites all surrounding fuel pellets. As such, smoldering pellets with lose temperature and cool without continued ignition from the heating element 220. Smoldering fuel pellets 235 at temperatures between 500° F. and 1000° F. may produce a high amount of "cold smoke" that is less than 150° F. in the upper compartment 105 of the pellet grill 100 where food is cooked.

Regulating the blower 215, motor 225, and heating element 220 to produce cold smoke is one exemplary grilling mode that a controller may accomplish. Other grilling modes of various other smoke temperatures and amounts can also be accomplished by regulating the various components of the pellet grill 100 as described above to increase or decrease rates of ignition and combustion of fuel pellets 235 inside the firepot 210.

Along these lines, referring back to FIG. 1, at least one embodiment of the pellet grill 100 may include a control box 125 that houses a controller, power supplies, processors, or other electronic components necessary for operating the various other components of the pellet grill 100 described herein. In the embodiment shown in FIG. 1, the pellet grill 100 includes a user control interface 120 on the outside surface of the control box 125. A user can adjust a control knob, or various other control interface buttons, on the user control interface 120 to adjust smoke temperature within the upper compartment 105 of the pellet grill 100 or set a timer to a desired cooking time.

Embodiments of pellet grills with battery power systems and measurement of the present disclosure can also include a direct-current power source. In at least one embodiment of a pellet grill 100, the direct-current power source may be a lithium-ion battery 130. One or more other embodiments may include other direct-current power sources. For example, at least one embodiment may include one or more alkaline batteries. One or more other embodiments may additionally, or alternatively, include other types of direct-current power sources.

For example, in at least one embodiment, a direct-current power source may include a direct-current solar cell. In at least one embodiment, the direct-current power source includes a car battery. Also, in at least one embodiment, the direct-current power source includes a direct-current power station, including generators, such as portable lithium solar generators. Additionally, or alternatively, the direct-current power source includes thermoelectric Peltier plate generators.

In at least one embodiment, the primary battery 130 is disposed on the outside of the pellet grill 100. Alternatively, or additionally, in one or more other embodiments, the primary battery 130 may be disposed at various other locations, either within or on the outside of the pellet grill 100. The primary battery 130 is wired to power the various components of the pellet grill 100, including but not limited to, the auger feeder system 200, blower 215, heating element 220, and a user control interface 120 display. In at least one embodiment, the primary batteries 130 disclosed herein are also be rechargeable and replaceable.

The embodiment of the pellet grill 100 illustrated in FIG. 1 includes a primary battery 130 and a battery clip 135 disposed on the outside of the hopper 115. A user can removably secure the primary battery 130 to the battery clip 135. In the embodiment illustrated in FIG. 1, the battery clip 135 is connected to a side surface of the hopper 115. In one or more other embodiments, the battery clip 135 may be disposed on any surface of the hopper 115 other than that shown in FIG. 1.

For example, in at least one embodiment, the battery clip 135 may be connected to the front surface of the control box 125 next to the user control interface 120. In yet another embodiment, the battery clip 135 may be connected to the back surface of the hopper 115 or other surfaces of the upper compartment 105 or lower portion 110. For example, in at least one embodiment, the battery clip 135 is disposed on a lower side of the lower portion 110 of the pellet grill 100. In any case, the battery clip 135 is disposed such that a user can conveniently access the primary battery 130 and battery clip 135 from outside the pellet grill 100.

Regarding the primary battery 130 and battery clip 135, a user can secure the primary battery 130 to the battery clip 135 so that an electrical connection is made between the two. The primary battery 130 is wired through the battery clip 135 to various components of the pellet grill 100 described above to provide electrical power to those components when a user secures the primary battery 130 to the battery clip 135. For example, in at least one embodiment, the primary battery 130 powers the auger feeder system 200, blower 215, heating element 220, and/or a user control interface when the user secures the primary battery 130 to the battery clip 135.

In at least one embodiment of the pellet grill 100, a manufacturer can include a battery cover to shield the primary battery 130 and battery clip 135 from the elements. For example, in one embodiment, the pellet grill 100 may include a cover that extends above and over the primary battery 130 and battery clip 135 so that the cover directs rain water over and away from the primary battery 130 and battery clip 135. In this way, the cover can keep the primary battery 130 and battery clip 135 dry.

Along these lines, at least one embodiment includes other components to shield the primary battery 130 and battery clip 135 from outside elements, such as dust, rain, moisture, and the like. For example, in at least one embodiment, the pellet grill 100 may include a box-type container with a lid or other access point around the primary battery 130 and battery clip 135.

In addition, in at least one embodiment, the control box 125 or lower portion 110 of the pellet grill 100 shields the primary battery 130 and battery clip 135 from the elements. This may be the case in embodiments described above, where the primary battery 130 and battery clip 135 are disposed on a lower surface of either the control box 125 or lower portion 110 of the pellet grill 100.

Figure 3A:
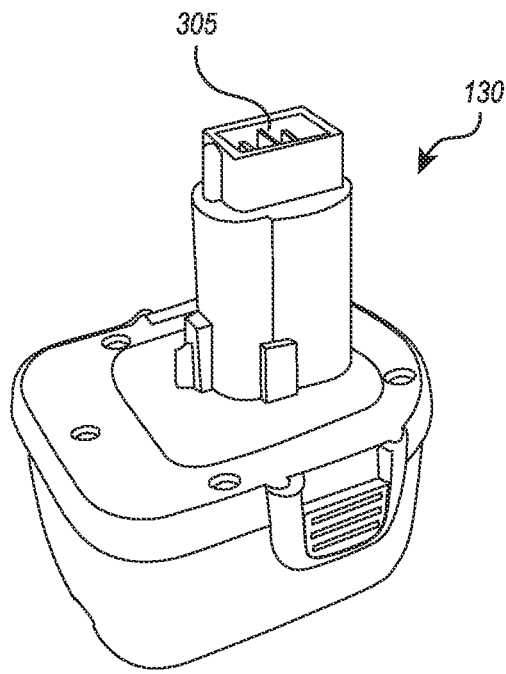
FIG. 3A illustrates an embodiment of a battery according to an embodiment of the present disclosure.

Turning now to the primary battery 130, FIG. 3A illustrates an exemplary embodiment of a primary battery 130 that a user can removably secure to the battery clip 135 to power the pellet grill 100. Such a primary battery 130 may also be configured to connect to a conventional hand-held power drill 300, as shown in FIG. 3C. The primary battery 130 comprises an electrical connection 305 that a user can insert into a battery clip 135 receiver 310, as illustrated in FIG. 3B, to removably secure the primary battery 130 to the battery clip 135.

Figure 3B:
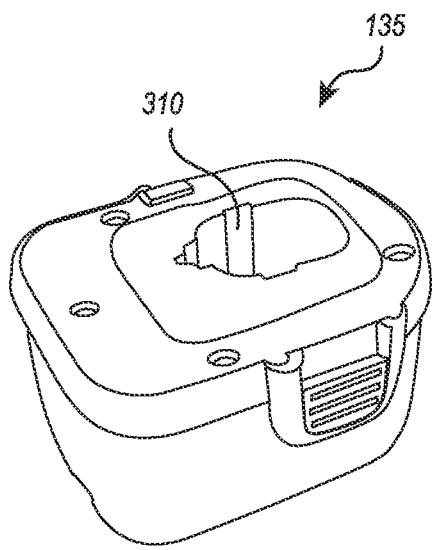
FIG. 3B illustrates an embodiment of a clip according to an embodiment of the present disclosure.
Figure 3C:
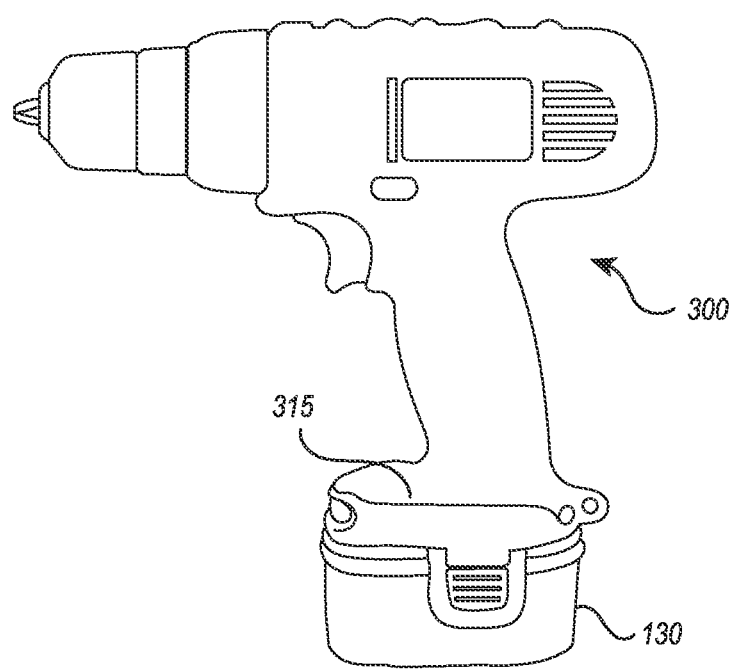
FIG. 3C illustrates an embodiment of a battery powered hand drill compatible with the battery illustrated in FIG. 3A according to an embodiment of the present disclosure.

As shown in FIG. 3A, in at least one embodiment, the electrical connection 305 comprises a male connection on the primary battery 130 with a corresponding female receiver 310 in the battery clip 135, as illustrated in FIG. 3B. Alternatively, in at least one embodiment, the battery clip 135 comprises a male electrical connection and the primary battery 130 comprises a female receiver.

One will appreciate that the primary battery 130 and battery clip 135 illustrated in FIGS. 2A and 2B are exemplary embodiments only. One or more other exemplary embodiments of primary batteries 130 and battery clips 135 may include electrical connections 305 and receivers 310 that slide together horizontally, magnetically attract one another, or otherwise secure together by means other than a user inserting an electrical connection 305 shown in FIG. 3A into a receiver 310 of a battery clip 135 shown in FIG. 3B.

For example, in at least one embodiment, the battery clip 135 may be integrally formed with the pellet grill 100. In such an embodiment, the receiver 310 may extend into the pellet grill 100 from an exterior surface of the control box 125, hopper 115, or lower portion 110. Accordingly, the primary battery 130 may be clipped directly to the pellet grill 100 itself. The battery clip 135 may also be otherwise hidden on the inside or outside of the pellet grill 100.

For example, in at least one embodiment, the battery clip 135 may reside inside the pellet grill 100, such as inside the control box 125. In such an embodiment, the control box 125 may include an opening that corresponds in position with the receiver 310 of the battery clip 135. The electrical connection 305 of the primary battery 130 may be inserted into the receiver 310 of the battery clip 135 through the opening in the control box 125. In this way, the primary battery 130 may connect exteriorly to the battery clip 135 residing inside the pellet grill 100.

Thus, in at least one embodiment as discussed above, the pellet grill 100 incorporates the battery clip 135 directly into the pellet grill 100 itself so that the battery clip 135 is not visible or the battery clip 135 may be integrated directly into the pellet grill 100 itself. Also, the electrical connection between the primary battery 130 and battery clip 135 allows a user to connect the same primary battery 130 to the pellet grill 100 and other devices and/or tools, such as, but not limited to, a conventional hand-held power tool such as a power drill 300.

One will appreciate that at least one embodiment includes male and female connections of the primary battery 130 and/or battery clip 135 in any number of configurations to accomplish a removable electrical connection as described above with respect to pellet grill 100. The term "male" and "female" electrical connections include any such connectors known in the art. For example, in at least one embodiment, a common stationary household electrical outlet and plug serve as the female and male connectors, respectively. Other embodiments of the pellet grill 100 may employ any electrical connection known in the art to accomplish the removable electrical connection between the primary battery 130 and battery clip 135 on pellet grill 100.

The various embodiments of battery clips 135 described herein and shown in the figures may be similar to a power drill clip 315, as shown in FIG. 3C. In this way, the same primary battery 130 that is compatible with the battery clip 135 on the pellet grill 100 may also be compatible with the power drill 300. Additionally, a user can employ a single same primary battery 130 for multiple tools, including the illustrated power drill 300, and the pellet grill 100, resulting in reduced cost and increased convenience for the user.

In this way, a user can maintain one or more primary batteries 130 that are each capable of powering multiple devices, including the pellet grill 100 and hand-held power drill 300 illustrated, and conveniently switch the battery from one device to the other. A user can easily clip-on and clip-off interchangeable batteries 130 from similar battery clips 135 of various devices.

In addition, the same primary battery 130 used with the pellet grill 100 may be recharged using a charger that was sold with the power drill 300. Also, in at least one embodiment, the pellet grill 100 also includes a charging station, either inside or outside the pellet grill 100. A user can utilize such a charging station to recharge primary batteries 130 for use on the pellet grill 100 or for use with other tools with which the primary battery 130 is also compatible.

As noted above, in at least one embodiment, the primary battery 130 of the pellet grill 100 is compatible with any number of other devices or tools. For example, a user can use a primary battery 130 for the pellet grill 100 that the user can also connect to a lawn care device, such as a weed-trimmer or leaf blower. Also, for example, a manufacturer can provide a primary battery 130 that a user can also connect to other tools or household appliances that require electrical power to operate.

Along these lines, at least one embodiment of the pellet grill 100 includes a variety of different battery clips 135 and primary batteries 130 on a single pellet grill 100. In at least one embodiment, for example, the pellet grill 100 includes a first battery clip that is compatible with one type of battery, a second battery clip that is compatible with another type of battery, a third battery clip that is compatible with a third type of battery, and so on. The number and type of battery clips included in the various embodiments of the pellet grill 100 described herein may vary so as to be compatible with various brands, sizes, or configurations of different batteries.

For example, a first brand of battery may be compatible with various other devices or tools of the same brand that a user may also possess. Accordingly, in at least one embodiment, the pellet grill 100 may include a battery clip 135 that is compatible with the first brand of battery so that the user can interchange the primary battery 130 of the pellet grill 100 with the user's other devices of the same first brand. Additionally, or alternatively, the pellet grill 100 may include battery clips 135 compatible with a second battery brand, or multiple other brands, so that the user can interchange the primary battery 130 of the pellet grill 100 with other tools or devices of corresponding brands that the user may also possess or use.

In at least one embodiment having multiple types of primary direct-current power sources 130 and battery clips 135, one type of battery clip 135 is only compatible with one type of primary direct-current power source 130. For example, in at least one embodiment, the pellet grill 100 has at least two battery clips 135, each of which are compatible with only one type of primary battery 130, such as a certain brand or size of primary battery 130. Additionally, or alternatively, in at least one embodiment, the pellet grill 100 includes numerous battery clips 135 that are each compatible with more than one type of primary battery 130. In at least one embodiment, the pellet grill 100 includes two or more battery clips 135 that are each compatible with the same type of primary battery 130 so that the same type of primary battery 130 can be connected to multiple battery clips 135.

As noted above, embodiments of pellet grills 100 powered by primary batteries 130 are portable because such pellet grills 100 are not tethered to a stationary electrical outlet via a power cord. However, a balance between the portability of the pellet grill 100 and the capacity of the primary battery 130 is important. The portability of the pellet grill 100 increases as the size and weight of the primary battery 130 decreases but the capacity of the primary battery 130 generally decreases as the size and weight of the primary battery 130 decreases.

For example, at least one embodiment of a pellet grill 100 includes a primary battery 130 that may power the pellet grill 100 for over twelve-hours on a single charge. A primary battery 130 of such capacity is likely very large and heavy, which makes it harder to move the pellet grill 100. However, powering the pellet grill 100 with a primary battery 130 that is very small or light to improve portability may not provide enough power or operation time needed for cooking.

Accordingly, in at least one embodiment of the pellet grill 100 described herein, the primary battery 130 may have a charge between 5-Volts and 130-Volts. In at least one embodiment, the primary battery 130 may have charge between 10-Volts and 70-Volts. In at least one embodiment, the primary battery 130 may have a charge between 20-Volts and 60-Volts. The foregoing voltages of primary batteries 130 result in both sufficient portability of the pellet grill 100 and sufficient power capacity to run the pellet grill 100.

As noted above, at least one embodiment of the pellet grill 100 includes a number of components that draw electrical power from the primary battery 130. These components may include, but are not limited to, an auger feeder system motor 225, blower 215, heating element 220, user interface display, and/or other electrical components such as processors and/or controllers.

In at least one embodiment, a pellet grill 100 that includes a primary battery 130 having the voltages described above is sufficiently portable. However, at times, a user may need to operate the pellet grill 100 for longer than the operation time provided such primary batteries 130. This is often true in the embodiments of pellet grills 100 described herein, which operate at lower temperatures and require longer cook times than traditional, high-heat gas grills.

In such cases, and according to at least one embodiment of the present invention, the pellet grill 100 utilizes small primary batteries 130, such as those in the voltage ranges noted above, while still operating for longer periods of time than would be provided by any one of the small primary batteries 130. For example, in at least one embodiment, the pellet grill 100 includes a secondary back-up battery to provide power while a user removes a spent primary battery 130 and replaces it with a charged primary battery 130.

For example, if a given primary battery 130 is configured to run the pellet grill 100 for eight hours, and the user desires to cook or warm food for more than eight hours, the user may need to replace the primary battery 130 before the food is fully prepared. Accordingly, in at least one embodiment of a pellet grill 100 comprising a secondary battery, the secondary battery powers the pellet grill 100 temporarily while the user switches out the primary battery 130.

In particular, the secondary battery may only power the grill for five to ten minutes while the user retrieves a new, charged primary battery 130 to connect to the battery clip 135, as described above. In at least one embodiment, the secondary battery may power the pellet grill 100 for less than five minutes. In one or more other embodiments, the secondary battery may power the pellet grill 100 for between five and ten minutes or for more than ten minutes.

Figure 4:
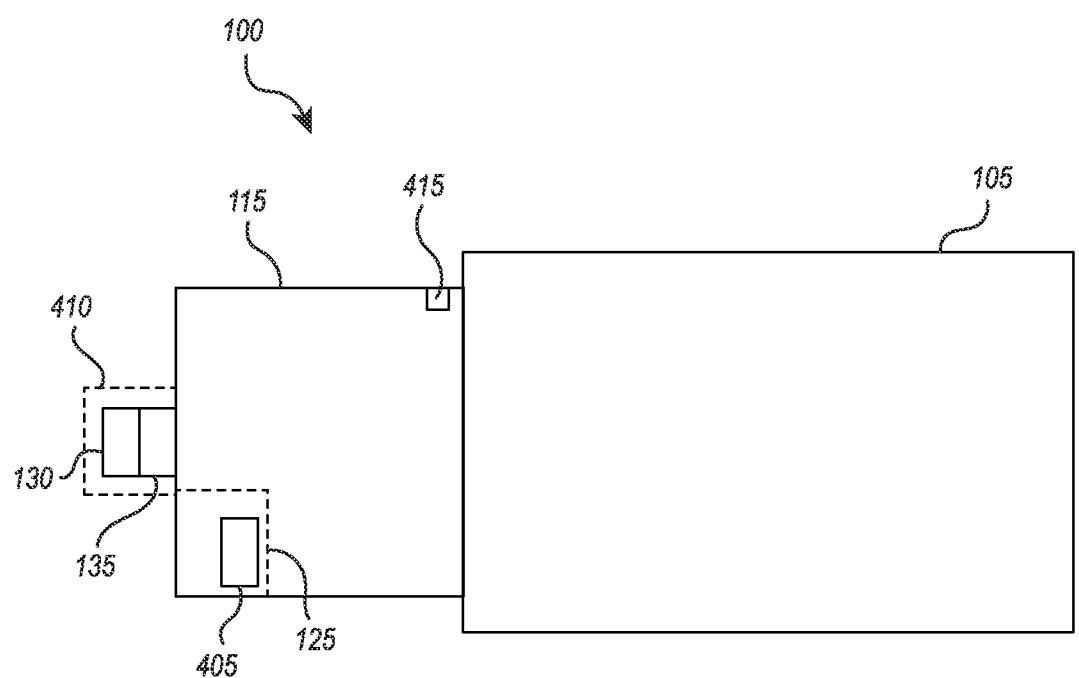
FIG. 4 illustrates a schematic view of a pellet grill with battery power systems and measurements having primary and secondary batteries according to an embodiment of the present disclosure.

Along these lines, FIG. 4 illustrates a schematic top view of a pellet grill 100 and various positions of primary and secondary batteries 130, 405. As illustrated, the primary battery 130 may be connected externally to the pellet grill 100 via the battery clip 135. As noted above, at least one embodiment of the pellet grill 100 may include a cover shield 410 or other protective box or casing that covers the external primary battery 130 but still allows a user to easily access the primary battery 130 for removal and installation.

In addition, the pellet grill 100 includes a secondary battery 405 disposed within the control box 125 inside or adjacent to the hopper 115. In at least one embodiment, the secondary battery 405 is disposed in other areas within the pellet grill 100, so that the secondary battery 405 is shielded from outside elements.

In at least one embodiment, the secondary battery 405 is disposed so that a user cannot easily remove or replace the secondary battery 405. In such an embodiment, the primary battery 130 and secondary battery 405 may be wired so that the primary battery 130 charges the secondary battery 405 while the primary battery 130 powers the pellet grill 100.

Alternatively, or additionally, in at least one embodiment, the secondary battery 405 may be disposed so that a user can easily remove, secure, replace, and/or recharge the secondary battery 405, similar to removing/replacing the primary battery 130, as described above.

Thus, in at least one embodiment of the pellet grill 100 described herein, the primary battery 130 may serve both as a power source to the pellet grill 100 as well as a charging source for the secondary battery 405.

Along these lines, in at least one embodiment, the pellet grill 100 and associated battery clip 135 may be configured to serve as a charging station for the primary battery 130. For example, at least one embodiment of the pellet grill 100 includes an electrical socket 415 into which a user can plug a power cord. The power cord can also be plugged into a stationary electrical outlet at the other end of the cord, such as into a household or other electrical outlet.

In such an embodiment, when the user plugs the power cord into the electrical socket 415, a polarity of the electrical connection between the primary battery 130 and battery clip 135 may be reversed so that the power cord provides power to charge the primary battery 130 through the battery clip 135. Additionally, or alternatively, the power cord plugged into the electrical socket 415 may also charge the secondary battery 405.

Additionally, or alternatively, in at least one embodiment, the power cord may also serve to power the pellet grill 100. In this way, a user can preserve primary battery 130 and secondary battery 405 life when the user is close enough to a stationary electrical outlet to conveniently connect through the power cord. However, the power cord may be removable from the electrical socket 415 so that the user can move the pellet grill 100 as far away from an outlet as desired and use the primary battery 130 to power the pellet grill 100.

Additionally, or alternatively, at least one embodiment of the pellet grill 100 includes an attached power cord. The power cord may be permanently wired and attached to the pellet grill 100 to provide an alternative source of power if the pellet grill 100 is used near an outlet.

In yet another embodiment, the pellet grill 100 may include a number of battery clips 135 as well as an electrical socket 415 for connecting a power cord to enable the grill to operate via battery power and/or power cord power while simultaneously serving as a charging station for other batteries that a user may want to charge. These other batteries may either be configured for use with the pellet grill 100 or for use with other devices, such as the hand-held power drill 300 or other electric devices discussed herein.

In embodiments of the pellet grill 100 that include the electrical socket 415 or attached power cords, the pellet grill 100 may also include a rectifier or other converter that converts alternating current into direct current. In this way, an embodiment of the pellet grill 100 connected to a power cord can run off direct current when plugged in to an alternating current power source, such as a typical AC electrical outlet.

In one or more of the illustrated embodiments of the present disclosure, the pellet grill 100 comprises a primary battery 130 and a secondary battery 405. It will be appreciated that one or more other embodiments of the pellet grill 100 may include more than one primary battery 130 and/or more than one secondary battery 405. For example, at least one embodiment of the pellet grill 100 includes two or more primary batteries 130 and corresponding battery clips 135 to provide added power and grilling time to the pellet grill 100.

Additionally, or alternatively, at least one embodiment includes two or more secondary batteries 405 to increase the time available to a user to replace the primary battery 130 during operation of the pellet grill 100. It will be appreciated that at least one embodiment of the pellet grill 100 includes any number of primary batteries 130, battery clips 135, and secondary batteries 405 at various locations on the outside of the pellet grill 100 or within the pellet grill 100, as discussed above.

Figure 5:
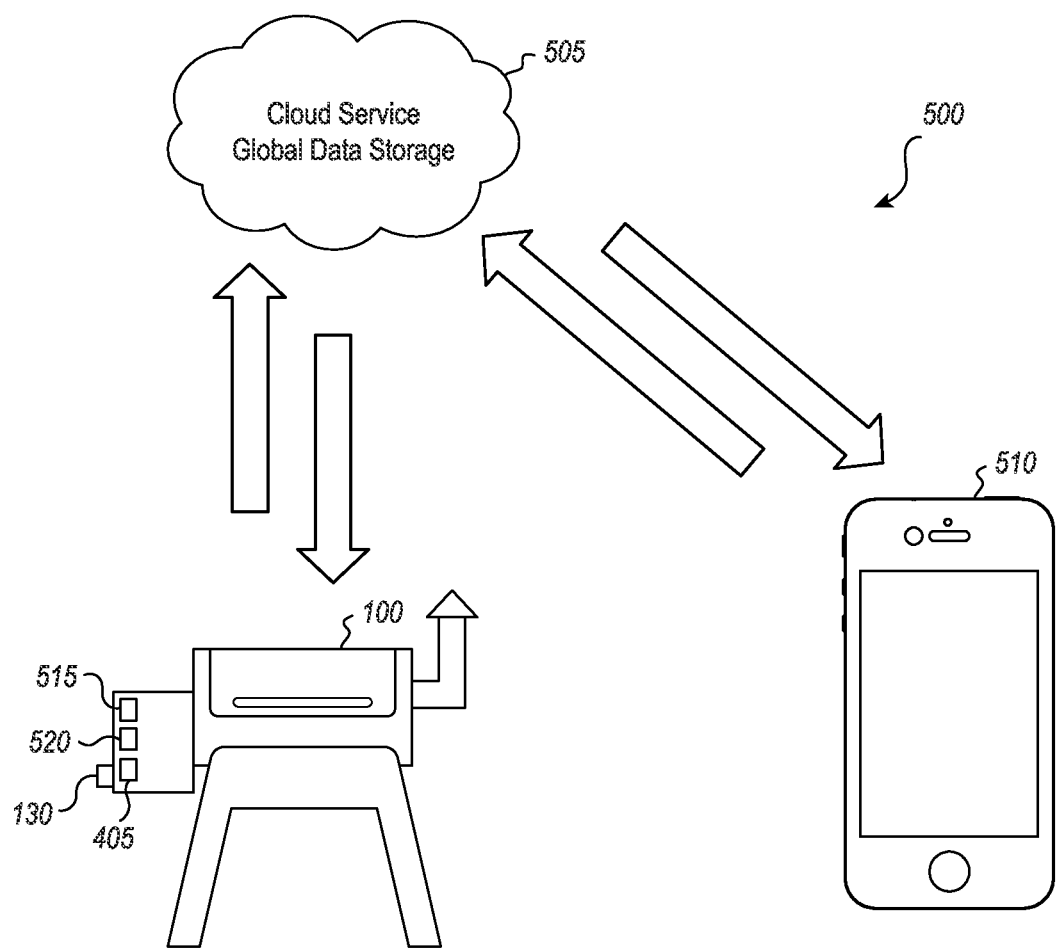
FIG. 5 illustrates a schematic representation of an embodiment of a pellet grill with battery power systems and measurements including a user feedback system according to an embodiment of the present disclosure.

Furthermore, with reference to FIG. 5, in at least one embodiment, a manufacturer can wire the primary battery 130 or other batteries to a controller 515 and/or processor 520 to measure the remaining power of the primary battery 130 or other batteries during, before, and/or after use. For example, in at least one embodiment, the controller 515 and/or processor 520 may measure the remaining voltage within the primary or secondary batteries 130, 405 as the user operates the pellet grill 100 to determine the amount of remaining power. In at least one embodiment, the controller 515 and/or processor 520 can also determine how much time remains before the batteries 130, 405 run out of power, based on the remaining voltage of the batteries 130, 405 and the power consumption of the pellet grill 100.

Optionally, in at least one embodiment of the pellet grill 100, the controller 515 and/or processor 520 is configured to relay information regarding the remaining power and/or time of the batteries 130, 405 to a mobile device 510. This relayed information may notify the user regarding the status of the batteries 130, 405 as the user runs the pellet grill 100. For example, FIG. 5 illustrates an embodiment of a user feedback system 500 in which a pellet grill 100 communicates with a mobile device 510. In the illustrated embodiment, the pellet grill 100 may be enabled with a WiFi router to communicate with the mobile device 510 via an online storage server, such as a cloud storage server 505.

For example, as seen in the embodiment of FIG. 5, the controller 515 and/or processor 520 of the pellet grill 100 sends information to a cloud service or other global data storage server 505. A user can then access that information via a smartphone or other mobile device 510. In this way, the pellet grill 100 notifies the user when the primary battery 130 is running low or how much time is left before the user needs to replace or recharge the batteries 130, 405.

Along these lines, a manufacturer provides a mobile app or other software application that the user can download onto the mobile device 510. In at least one embodiment, the software application alerts the user using visual and/or audio notifications. These notifications allow the user to be able to leave the pellet grill 100 and still check on the status of the batteries 130, 405. Advantageously, the user does not need to remain close to the pellet grill 100 during the operation thereof to repeatedly check on the power status of the batteries 130, 405.

Additionally, or alternatively, in at least one embodiment, the software application identifies how much power remains based on unique characteristics of the pellet grill 100 during operation. For example, in at least one embodiment, the software application identifies the average power expenditure from the auger motor 225, heating element 220, and/or blower 215 during operation. Also, for example, in at least one embodiment, the software application calculates time remaining in primary battery 130 by also taking into account certain recipe requirements, such as changes in temperature over time. For example, in at least one embodiment, the software application can account for increased power consumption that will be required in the future based on the requirement of a certain recipe to increase temperature at the end of the cooking time.

Furthermore, in at least one embodiment, the user can send a signal instructing the pellet grill 100 to minimize power consumption, in order to maximize remaining battery capacity, while ensuring the food inside the grill remains at or above FDA recommended food safe air cooking temperatures (145° F.) to prevent spoiling. Once the controller 515 and/or processor 520 performs the calculations necessary to reduce power consumption and maintain safe air temperature, the pellet grill 100 can send an alert to the user notifying the user of the temperature and power consumption status achieved.

Also, in at least one embodiment, the software application calculates power consumption of the pellet grill 100 and/or time remaining for the primary battery 130 based on the temperature of the food cooking in the pellet grill 100. This temperature may, for example, be provided by a temperature probe. In at least one embodiment, such a temperature probe is inserted into meat cooking in the pellet grill 100 and relays temperature information to the controller 515 and/or processor 520.

In at least one embodiment, a certain recipe may call for cooking a steak until a desired internal temperature of the steak is reached. For thicker cuts of meat, the time required, and thus the power consumption required, to achieve the desired temperature is more than the time and power consumption required for a thinner cut of meat. Based on the probe temperature, at least one embodiment of the software application can take this probe temperature into account to calculate the remaining cook time, power consumption, and whether the battery 130 has enough power remaining and send an alert to the mobile device 510 before or during the cook.

Also, for example, in at least one embodiment, the software application calculates the power consumption needed or remaining based in part on the ambient temperature outside the pellet grill 100. For example, maintaining a certain temperature within the pellet grill 100 requires more power in cold weather than it does in hot weather.

Likewise, a manufacturer can configure the controller 515 and/or processor 520 of the pellet grill 100 to receive signals from the cloud or data storage 505 server, through which a user can alter the operation of the pellet grill 100 from the mobile device 510. For example, in at least one embodiment, a user who may or may not be near the pellet grill 100 at the time, can send a signal from a mobile device 510 to the pellet grill 100 via the cloud service 505 to decrease or increase the temperature of the pellet grill 100 as desired.

In addition to the functions of the cloud service and/or data storage 505 described above, in at least one embodiment, the data storage 505 may store information and documents. For example, in at least one embodiment, the user stores recipes for smoking meats, vegetables, fruits or other food items. Using the cloud service 505, a customer or user may use their mobile device 510, tablet, laptop, desktop or other computer system to control the functions of the pellet grill 100.

The cloud storage and communication described above may include monitoring functionalities. For example, in at least one embodiment, the user may remotely monitor the internal temperature, external ambient air temperature, probe temperature (e.g. from probes that communicate wirelessly), and various alerts that may be sent by the pellet grill 100. Other controls may include adjusting the temperature by adding more fuel pellets 235, reducing the rate of fuel pellets 235 being fed by the auger feeder system, turning the pellet grill 100 on or off, turning certain components of the pellet grill 100 on or off, controlling the timer or custom cooking cycles, or monitoring probe temperature alerts.

Many more controls may be provided on the mobile device 510, and the amount and type of controls may be updated over time to add new functionality. For example, in at least one embodiment, the pellet grill 100 can be used as a wireless hub for other devices. In at least one embodiment, these other devices can leverage the WiFi connectivity of the pellet grill 100 to the internet through the incorporation of cellular or long-range WiFi communications.

In particular, as control inputs are received at the mobile device 510 (or other electronic device), they are passed to the cloud service 505 via a wired or wireless data transmission. The control inputs are then passed to the pellet grill 100 directly or via an access point such as a WiFi router. In this manner, a user can control the grill from substantially any location that has internet access. In at least one embodiment, the user may even be able to ignite the pellet grill 100 remotely, while in other cases, such functionality may be disabled unless the user is within a specified distance of the grill, as determined by a GPS or Bluetooth geofence. Other electronic transmission methods, such as blue-tooth, are also contemplated to allow the pellet grill 100 to communicate with the mobile device 510 of the user.

Figure 6:
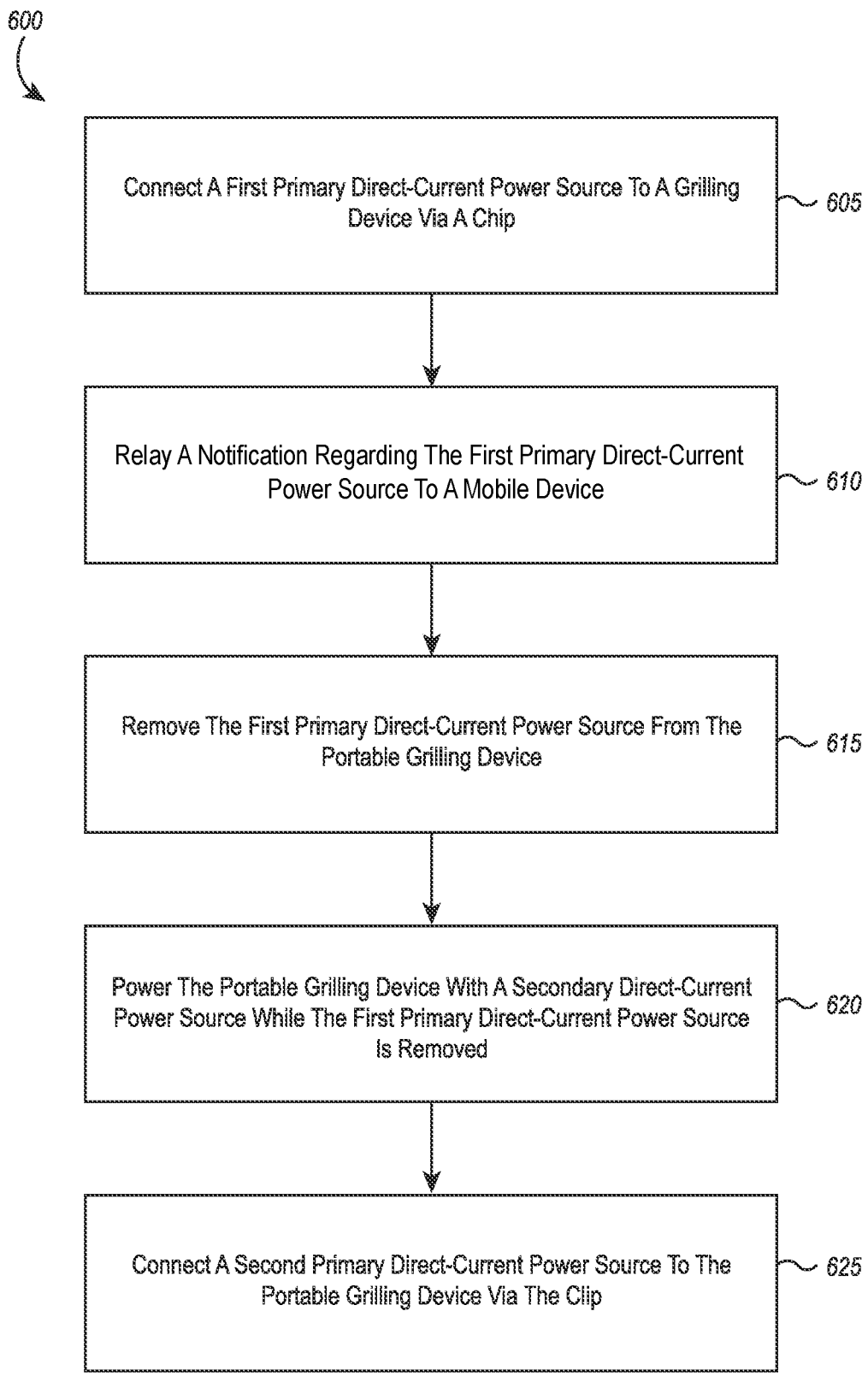
FIG. 6 illustrates a flowchart of a method of powering a pellet grill with battery power systems and measurements according to an embodiment of the present disclosure.

Accordingly, as shown in FIG. 6, in at least one embodiment of the present disclosure, a method 600 of powering the pellet grill 100 includes a first step 605 of connecting a first primary direct-current power source to the portable grilling device via a clip. For example, FIGS. 1, 2B, 4, and 5 depict a pellet grill 100 powered by a primary battery 130.

Optionally, in at least one embodiment as described above, a second step 610 includes relaying a notification regarding the first primary direct-current power source to a mobile device. This second step 610 is depicted, for example, by the user feedback system 500 shown in FIG. 5. As noted above with reference to FIG. 5, in at least one embodiment, the information includes the power consumption of the pellet grill 100, or sub-components thereof, during use. In at least one embodiment, the information includes time remaining in the first primary direct-current power source.

In addition, in at least one embodiment, a third step 615 of the method 600 includes removing the first primary direct-current power source from the pellet grill 100. This may be done, for example, when the first direct-current power source, including the various primary batteries 130 described herein, run out of power.

Additionally, or alternatively, in at least one embodiment, a fourth step 620 of the method 600 includes powering the pellet grill 100 with a secondary direct-current power source while the first primary direct-current power source is removed. For example, a secondary direct-current power source (secondary battery 405) is depicted in FIGS. 4 and 5. As noted above with reference to FIG. 4, the secondary direct-current power source may be a secondary battery 405 disposed inside the pellet grill 100.

Furthermore, at least one embodiment of the method 600 includes a fifth step 625 of connecting a second primary direct-current power source to the portable grilling device via the clip. This second direct-current power source is also depicted in FIGS. 1, 2B, 4, and 5 as primary battery 130.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

USB connection on the grill would also allow user to charge other devices, such as phones, that do not use the same interface as the primary battery clip even when the grill is not in use for cooking.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc., for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs . . . etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A portable food-heating device, comprising:
   a clip configured to removably connect to a first primary power source,
   wherein the portable food-heating device is configured to electrically connect to a second primary power source, and
   wherein electrical connections between the clip and the first primary power source reverse polarities to charge the first primary power source when the portable food-heating device is powered by the second primary power source.

2. The portable food-heating device of claim 1, wherein the first primary power source comprises a direct-current power source and the second primary power source comprises an alternating-current power source.

3. The portable food-heating device of claim 1, further comprising a user feedback system configured to relay information regarding the first primary power source to a user.

4. The portable food-heating device of claim 1, further comprising a secondary power source that supplies power to the portable food-heating device when the portable food-heating device is not being powered by the first primary power source or the second primary power source.

5. The portable food-heating device of claim 4, wherein the second primary power source is configured to at least partially charge the secondary power source while simultaneously providing power to the portable food-heating device during use.

6. The portable food-heating device of claim 1, wherein the clip is removably secured to the first primary power source.

7. The portable food-heating device of claim 1, wherein the first primary power source comprises one or more batteries.

8. The portable food-heating device of claim 1, further comprising an upper compartment and a lower portion below the upper compartment, wherein the clip is located on a surface of the lower portion.

9. The portable food-heating device of claim 1, further comprising another clip configured to receive a third primary power source but not the first primary power source, wherein the clip is configured to receive the first primary power source but not the third primary power source.

10. The portable food-heating device of claim 1, further comprising a controller configured to operate the portable food-heating device to prevent a temperature of a food item within the portable food-heating device from falling below a minimum food-safe temperature.

11. A portable food-heating device, comprising:
a connection feature configured to electrically connect to a primary power source, the connection feature comprising a clip;
a temperature probe configured to measure a temperature of a food item within the portable food-heating device; and
a controller configured to operate the portable food-heating device to prevent the temperature of the food item from falling below a minimum food-safe temperature;
wherein the portable food-heating device is configured to electrically connect to an additional primary power source; and
wherein electrical connections between the clip and the primary power source reverse polarities to charge the primary power source when the portable food-heating device is powered by the additional primary power source.

12. The portable food-heating device of claim 11, wherein the minimum food-safe temperature is 145 degrees Fahrenheit.

13. The portable food-heating device of claim 11, wherein the primary power source comprises at least one of a generator, batteries, and direct-current solar cells.

14. The portable food-heating device of claim 11, further comprising a secondary power source that supplies power to the portable food-heating device when the portable food-heating device is not being powered by the primary power source.

15. The portable food-heating device of claim 11, wherein the primary power source is compatible with at least one other device so that the primary power source can be connected to the at least one other device to power the at least one other device.

16. The portable food-heating device of claim 11, further comprising a user feedback system configured to relay information to a user regarding the primary power source, wherein the primary power source comprises a direct-current power source, and wherein the information comprises a duration of time remaining before the direct-current power source runs out of power.

17. The portable food-heating device of claim 16, wherein the user feedback system is configured to minimize power consumption of the portable food-heating device responsive to a user signal to maximize remaining time left before the direct-current power source runs out of power.

18. A method of powering a portable food-heating device, comprising:
receiving a first primary power source being a first type of power source via a clip on the portable food-heating device, the clip configured to connect to multiple types of power sources;
relaying a notification regarding the first primary power source to a mobile device;
determining whether the first primary power source is connected to the clip;
activating a secondary power source to power the portable food-heating device while the first primary power source is disconnected from the clip; and
receiving a second primary power source via the clip, the second primary power source being a second type of power source different from the first type of power source of the first primary power source.

19. The method of claim 18, further comprising minimizing power consumption of the portable food-heating device responsive to a user signal, wherein minimizing power consumption of the food-heating device comprises maintaining a food-safe air cooking temperature within the portable food-heating device.

* * * * *